J. Crowner,
Stump Elevator.
Nº 52,271. Patented Jan. 30, 1866.

Witnesses:
Wm. E. Lyon.

Inventor:
John Crowner.

UNITED STATES PATENT OFFICE.

JOHN CROWNER, OF WELLSVILLE, NEW YORK.

IMPROVED STUMP-EXTRACTOR.

Specification forming part of Letters Patent No. 52,271, dated January 30, 1866.

*To all whom it may concern:*

Be it known that I, JOHN CROWNER, of Wellsville, in the county of Allegany and State of New York, have invented a new and Improved Stump-Extractor; and I do hereby declare that the following is a full, clear, and exact description thereof, which will enable those skilled in the art to make and use the same, reference being had to the accompanying drawings, forming part of this specification, in which—

Figure 1:
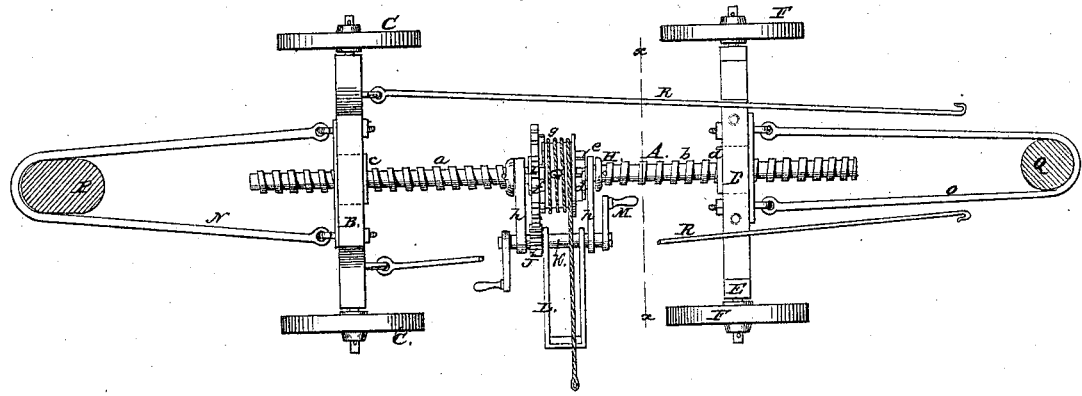
Figure 2:
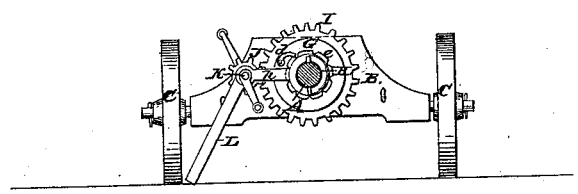

Figure 1 is a plan or top view of my invention; Fig. 2, a transverse vertical section of the same, taken in the line $x\,x$, Fig. 1.

Similar letters of reference indicate corresponding parts.

This invention relates to a new and improved machine for extracting stumps; and it consists in the employment or use of a right-and-left-hand screw fitted in nuts in axles mounted on wheels, such screw being operated by a drum or by gearing, and the axles arranged with rods or chains applied in the manner substantially as hereinafter set forth, whereby stumps may be extracted with the greatest facility and with but a moderate expenditure of power.

A represents a right-and-left-hand screw-shaft, $a$ being the right and $b$ the left hand screw. The right-hand screw $a$ works in a nut, $c$, fitted in an axle, B, mounted on two wheels, C C, and the left-hand screw $b$ works in a nut, $d$, fitted in a bolster, D, which is attached centrally to an axle, E, by a king-bolt arranged in any suitable manner. The axle E is mounted on wheels F E, and is allowed to turn like the front axle of any ordinary wheel-vehicle, in order to facilitate the drawing of the device from place to place.

On the screw-shaft A, at about its center, there is a drum, G, which is placed loosely on a cylinder, H, the latter being keyed firmly to the screw-shaft A. The drum is connected to the cylinder H by means of a pawl, $d$, which is pivoted to one side of the drum, and engages with a ratchet, $e$, at one end of the cylinder H. A ratchet, $f$, is also attached to the opposite end of the drum, with which a pawl, $g$, attached to a toothed wheel, I, engages, the wheel I being placed loosely on the cylinder H, and connected with the drum by the pawl and ratchet $g\,f$.

J is a pinion which gears into the wheel I. This pinion is on a shaft, K, the bearings of which are in arms $h\,h$ placed loosely on the cylinder H. On the shaft K there is fitted loosely a pendent frame, L, to support the shaft K when the screw-shaft is turned through the medium of the gearing described. The shaft K is provided with cranks M at its ends for the convenience of turning it.

It will be seen that by turning the screw-shaft A the axles B E will be drawn toward or moved from each other, according to the direction in which the screw-shaft is turned.

To the axle B there is attached a bail-shaped rod, N, and a similar rod, O, is attached to the bolster D. The rod N is anchored, as shown at P, in any suitable manner so as to be firm, and the opposite rod, O, is affixed to the stump Q to be extracted.

If a horse is used to operate the device, a rope is wound around the drum G and the horse attached to its end, the drum being connected with the cylinder H by means of the pawl $d$ fitting in the ratchet $e$. The axle B being anchored, it will be seen that the other axle, E, will, when the screw-shaft A is turned, be drawn in a direction toward the axle B and the stump extracted. The screw shaft may be operated by hand by turning the shaft K.

In case the stump is not sufficiently acted upon at one operation of the screw-shaft, rods R R, which are attached to the axle B, are connected to the stump to hold it, the rod O detached, and the screw-shaft A turned in a contrary direction, so as to bring the axle E back to its original position, which may be done through the medium of the gearing, the rod O being readjusted to the stump and the latter subjected to a succeeding operation.

I would remark that chains may be used instead of the rods N O, if desired.

Having thus described my invention, I claim as new and desire to secure by Letters Patent—

1. The right-and-left-hand screw-shaft A, arranged with nuts applied to axles or other moving parts, in connection with rods, chains, or other equivalent means to anchor the device and attach or apply the same to the stump, substantially as set forth.

2. The drum G, applied to the screw-shaft A, as shown, and having a rope or chain attached to it for the purpose of communicating motion to the screw-shaft by a draft-animal.

3. The gearing I J and support L, in combination with the drum G and screw-shaft A, substantially as and for the purpose specified.

JOHN CROWNER.

Witnesses:
L. FOSTER,
Z. H. JONES.